United States Patent [19]

Kato

[11] Patent Number: 5,055,954
[45] Date of Patent: Oct. 8, 1991

[54] CASSETTE LOADING APPARATUS IN WHICH CASSETTE IS LOADED SHORT SIDE FIRST

[75] Inventor: Takahiro Kato, Kawagoe, Japan
[73] Assignee: Pioneer Electronic Corp., Tokyo, Japan
[21] Appl. No.: 363,806
[22] Filed: Jun. 9, 1989
[30] Foreign Application Priority Data Nov. 30, 1988 [JP] Japan .................................. 63-300640

[51] Int. Cl.⁵ ..................... G11B 15/675; G11B 15/66
[52] U.S. Cl. ...................................... 360/96.5; 360/85
[58] Field of Search ....................... 360/96.5, 96.6, 85, 360/84

[56] References Cited
U.S. PATENT DOCUMENTS 4,881,137 11/1989 Meguro et al. .................... 360/96.5

Primary Examiner—Robert S. Tupper

[57] ABSTRACT

A tape loading apparatus for loading a cassette tape with a lid and locking member transversely to said elongated side of said cassette. A holder in said housing receives the cassette, short side first, and holds it as it is pulled in relative to the housing. A slider opening-closing plate is then moved from an out-of-the-way position to a position whereby engaging claws and a projection engage the slider of said cassette and the locking claw of said cassette, thereby releasing said locking claw and sliding back said slider to unlock the cassette lid. The housing is then moved vertically downward to place the cassette in a tape playing position. A cam plate with multiple cam slots cooperates with multiple lever arms to move the holder, slider opneing-closing plate, and housing in the proper sequence and directions.

4 Claims, 13 Drawing Sheets

CASSETTE LOADING APPARATUS IN WHICH CASSETTE IS LOADED SHORT SIDE FIRST

BACKGROUND OF THE INVENTION

1. Field of the Industry

The present invention relates to a cassette loading apparatus in which a lid for covering a tape running face, such as a tape cassette for digital audio, is disposed, and the tape cassette has a slider for locking the opening of the lid by sliding the slider in a direction perpendicular to the lid to prevent the lid from accidentally opening, and when the tape cassette is inserted from an insertion port of a tape deck, the slider is slid to open the lid while the tape cassette is held and is carried to a position for engagement with a tape drive mechanism.

2. Prior Art

In a conventional cassette loading apparatus for a tape deck of this type, the lid is directed on the deeper side of the apparatus and is inserted from the insertion port of the cassette. The slider is engaged during this insertion and the lid is opened by lowering the tape cassette, and the cassette engages the tape drive mechanism.

In a tape cassette of the latter type, the length of the lid face is longer than that of the side face of the lid perpendicular to the lid face. Accordingly, the insertion port of the tape deck is long in the transversal direction However, in a tape deck for a vehicle, the area of the front face must be small, and there must be space on the front panel for a thumbscrew, a push button, a display device, etc., for operating the tape deck. Therefore, it is desirable to have a small cassette insertion port. However, in the conventional cassette loading apparatus, the cassette insertion port cannot be made small since the insertion port is elongated to receive the cassette, lid face first.

SUMMARY OF THE INVENTION

To solve the above-mentioned problems of the conventional cassette loading apparatus, a first object of the present invention is to provide a cassette loading apparatus in which, by inserting the cassette into the cassette insertion port from a side face perpendicular to the lid, the transversal length of the insertion port is shortened and the area for the front face panel of the tape deck can be reduced, or the areas for arranging the thumbscrew, the push button, the display device, etc., can be increased.

A second object of the present invention is to provide a cassette loading apparatus for simplifying the operations of a holder for pulling-in the tape cassette, a slider opening-closing member for sliding the slider, and a housing section for disposing these members therein, and simplifying the mechanism of such a structure.

To attain the above objects, a cassette loading apparatus in the present invention comprises a holder for supporting the tape cassette inserted into the cassette insertion port with the lid located on a cassette side face inserted first and insertion the tape cassette into a housing; a slider opening-closing member movable in a direction perpendicular to the moving direction of the holder to move the cassette slider; and a housing for disposing these members therein and movable in the vertical direction to engage the tape cassette with the tape drive mechanism.

DETAILED DESCRIPTION OF THE PREFERRED EMBODIMENT

One embodiment of a cassette loading apparatus in the present invention will now be described with reference to the accompanying drawings.

Figure 12:
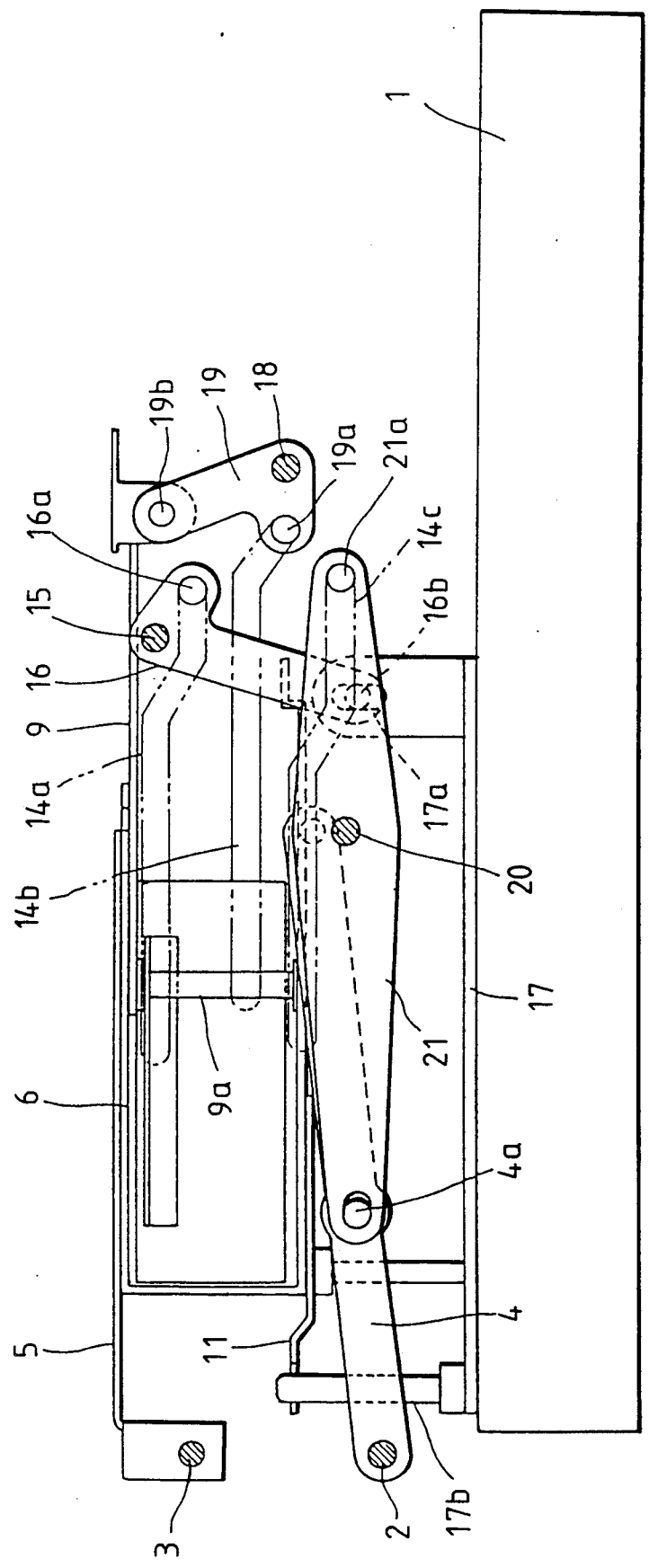
FIGS. 12 and 13 are rear views at the operating time of the rack of FIG. 11.

As shown in FIG. 12, a housing 6 is attached to ends of a support arm 4 and a support plate 5 pivotally supported by shafts 2 and 3, respectively, of chassis 1, so that housing 6 can be vertically elevated and lowered by the rotation of support arm 4. When housing 6 is elevated by the rotation of support arm 4 as in FIG. 12, an opening portion of the housing on the left-hand side of this figure is opposite a cassette insertion port of a tape deck and the tape cassette can be inserted into the cassette insertion port.

Figure 1:
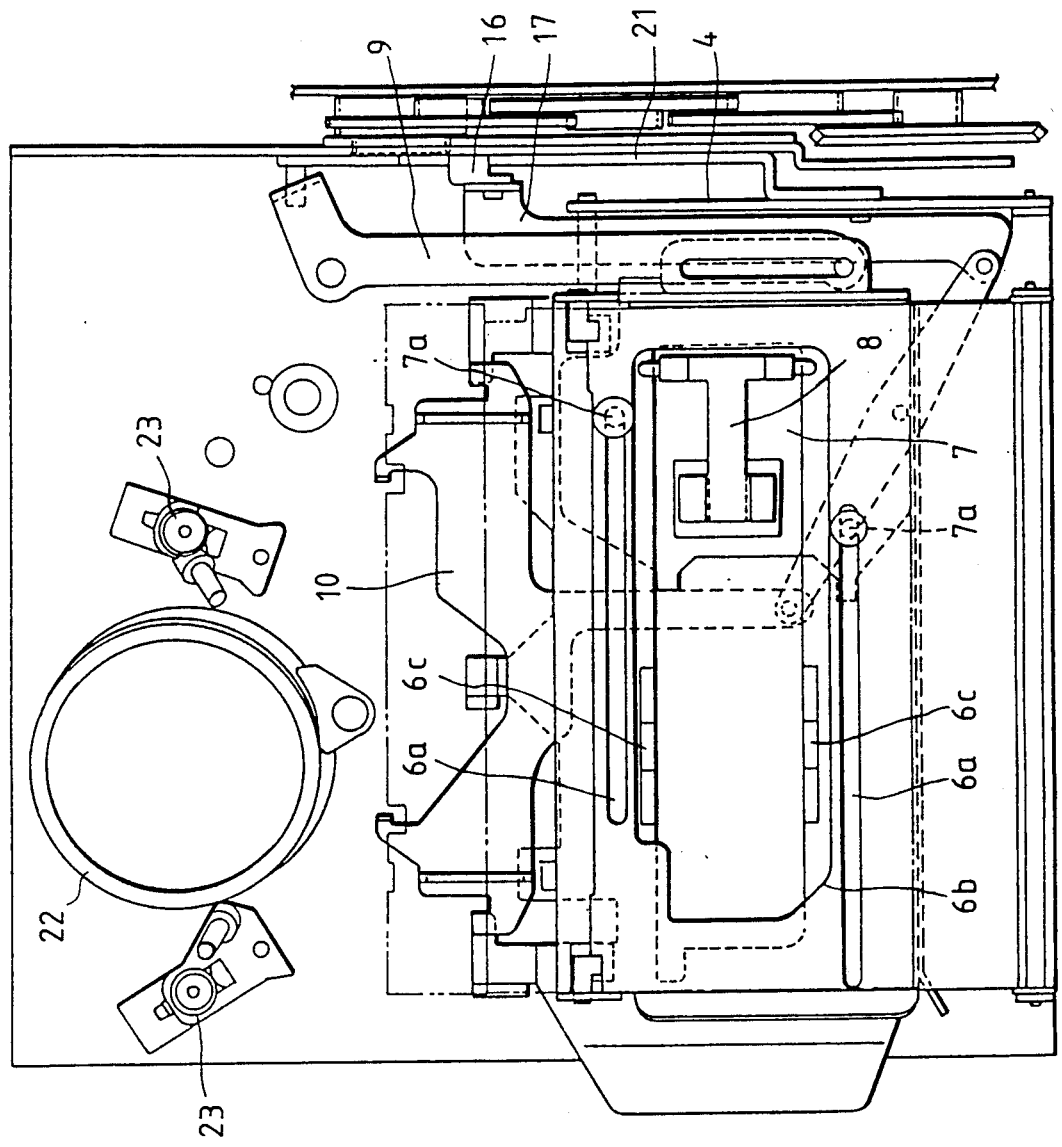
FIG. 1 is a plan view of a preferred embodiment of the present invention.

As shown in FIG. 1, elongated slots 6a and 6b are disposed in housing 6 in the insertion direction of the tape cassette. Holder 7 is movably attached to housing 6 in the insertion direction of the tape cassette by insertion pin 7a of holder 7 into elongated slot 6a.

Figure 4:
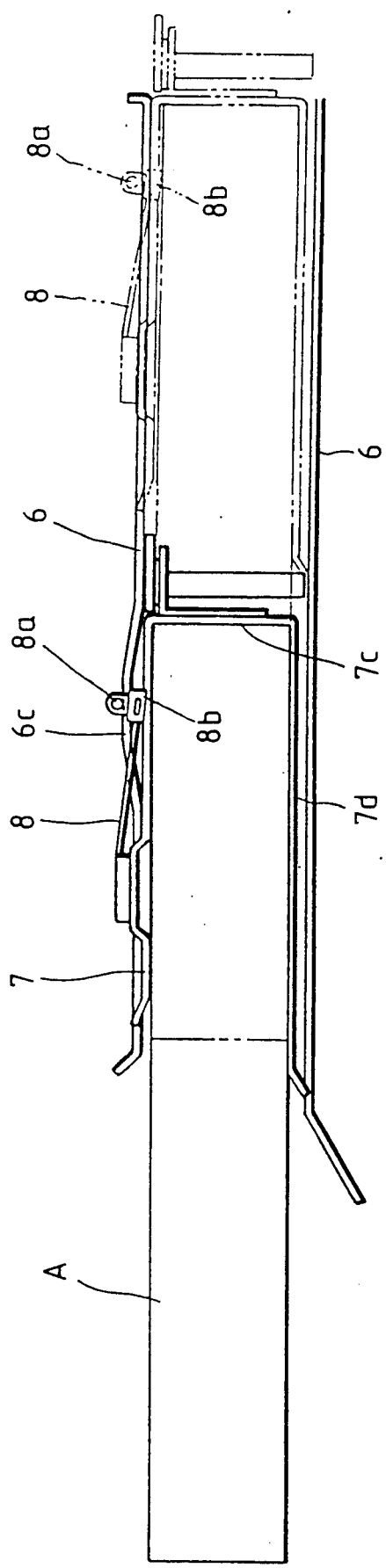
FIG. 4 is a side view showing the operation of the holder.

A rising portion 6c is formed in elongated slot 6b on the left-hand and right-hand sides of a portion thereof. When holder 7 is moved toward the opening side of housing 6, pin 8a (FIG. 2) at one end of leaf spring 8, which is attached at the other end thereof to holder 7, is moved onto rising portion 6c, and a rubber piece 8b attached to leaf spring 8 is separated from an upper face of the tape cassette. A side view of the relation between holder 7, leaf spring 8, pins 8a, rubber piece 8b, rising portion 6c, and a tape cassette A, is shown in FIG. 4.

However, when holder 7 is moved into the deeper side of housing 6 (FIG. 3 and to the far right in FIG. 4), pin 8a is moved downwards from rising portion 6c, and rubber 8b contacts and presses tape cassette A by the force of leaf spring 8 so that holder 7 holds tape cassette A.

Guide slot 7b (FIG. 2) is disposed in holder 7, and pin 9a of rotary arm 9 is inserted into this guide slot. Holder 7 is moved in the elongated direction of elongated slot 6a by the rotation of rotary arm 9.

Figure 5:
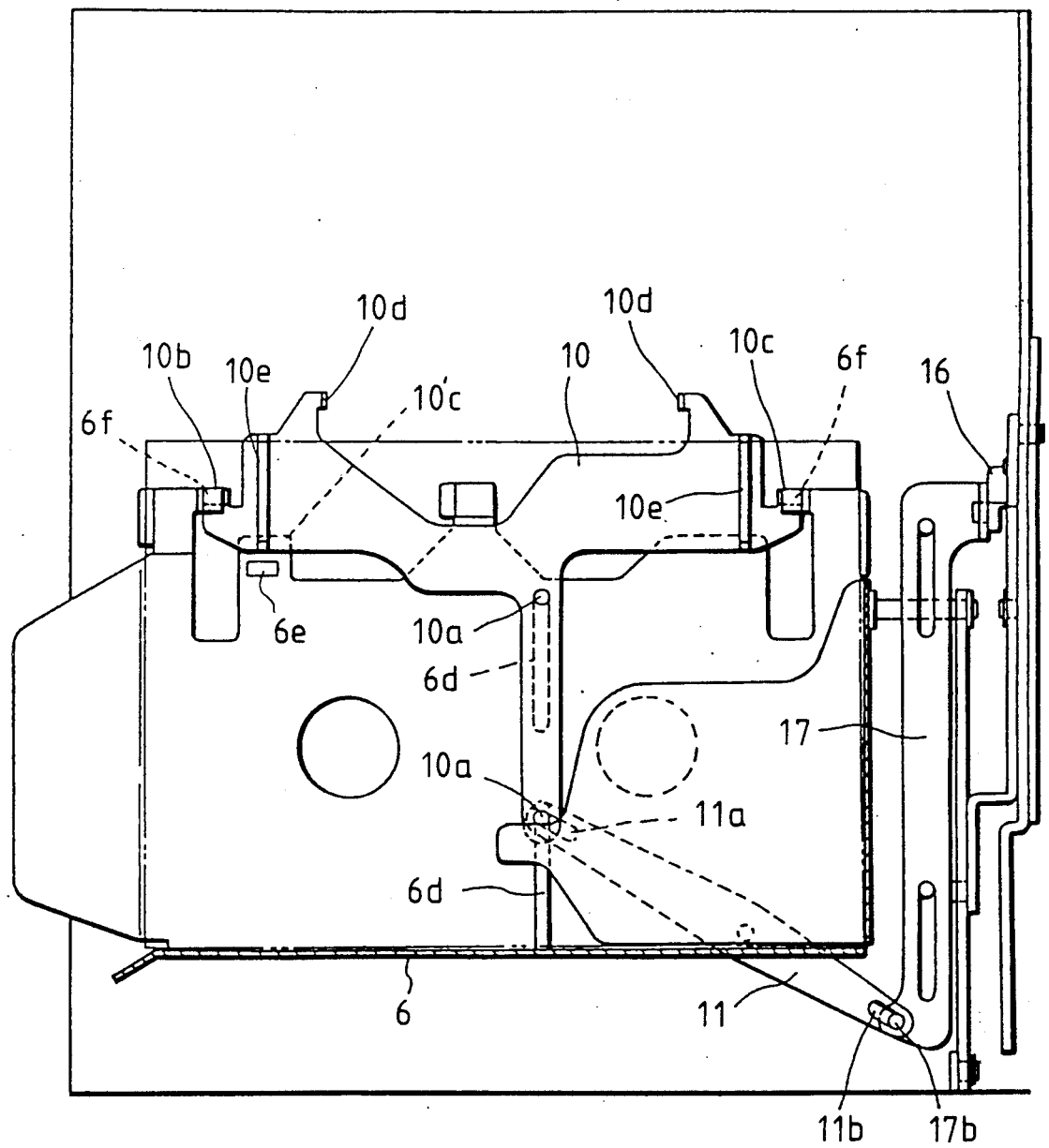
FIGS. 5 and 6 are plan views showing the operation of a slider opening-closing plate.

As shown in FIG. 5, an elongated slot 6d is disposed in housing 6 in a direction perpendicular to the elongated direction of elongated slot 6a. A pin 10a of a slider opening-closing plate 10 is inserted into elongated slot 6d, and the slider opening-closing plate 10 is movable in the direction perpendicular to the longitudinal direction of holder 7.

Figure 7:
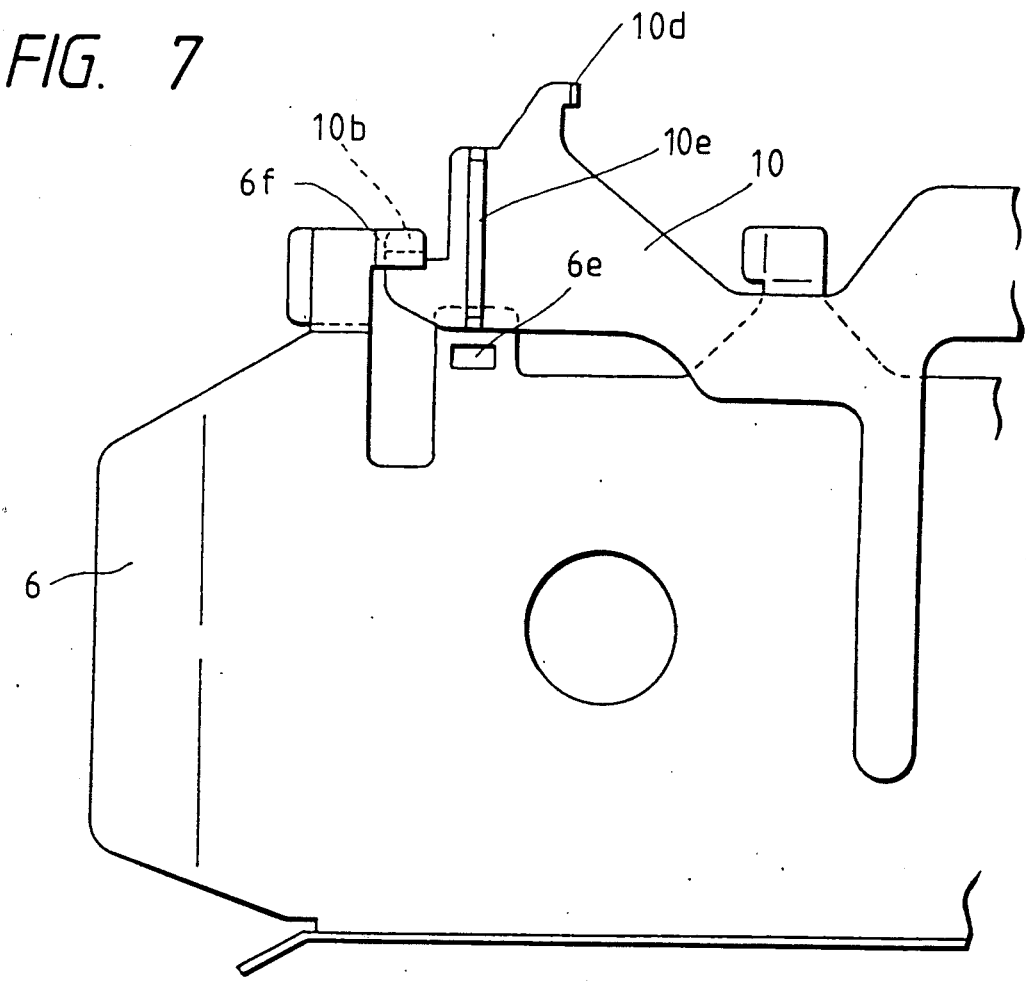
FIG. 7 is a plan view of a main portion of the slider opening-closing plate.
Figure 8:
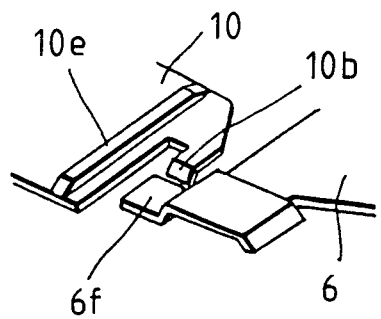
FIGS. 8 and 9 are perspective views showing important portions of FIG. 7.
Figure 9:
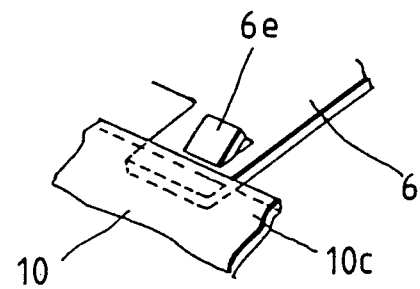

As shown in FIGS. 7 to 9, a slanting face 6e is disposed in housing 6, and a slanting face 10b is disposed in slider opening-closing plate 10. As shown in FIG. 5, when slider opening-closing plate 10 is moved in the upward direction of the Figure, slanting face 10b is guided on a lower face side of a support piece 6f of housing 6 and slider opening-closing plate 10 is lowered.

However, when slider opening-closing plate 10 is moved in a downward direction as shown in FIG. 5, slanting face 10b is released from support piece 6f and support piece 10c of slider opening-closing plate 10 is guided onto slanting face 6e, thereby elevating slider opening-closing plate 10.

In slider opening-closing plate 10, claw portion 10d (FIG. 5) contacts slider $A_1$ (FIG. 17) of tape cassette A and presses and slides this slider, and projecting portion 10e (FIG. 8) pushes upwards locking claw $A_2$ for locking the sliding movement of slider $A_1$. See FIGS. 14–18.

An elongated slot 11a (FIG. 5) of a rotary arm 11 has inserted therein one of pins 10a of slider opening-closing plate 10, and slider plate 10 is slid along elongated slot 6d by the rotation of rotary arm 11.

Figure 10:
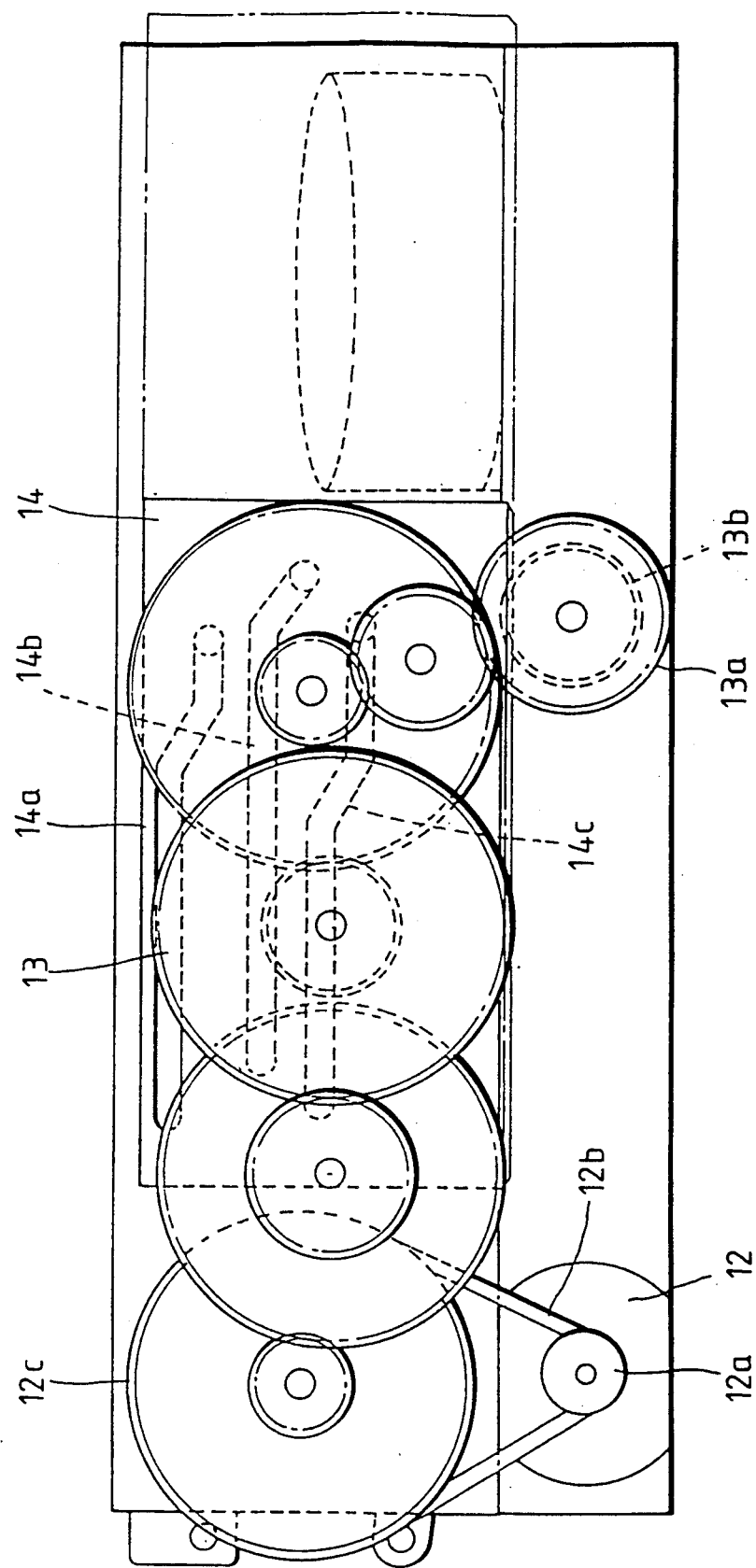
FIG. 10 is a rear view showing a drive mechanism by a motor.

As shown in FIG. 10, a motor 12 attached to a chassis 1 rotates a pulley 12c through pulley 12a and belt 12b so that gear 13a at the final stage is rotated through speed reduction gear 13 at a few stages, thereby rotating gear 13b coaxially disposed together with gear 13a.

Gear 13b is engaged with a rack 14, which slides on chassis 1 as shown by the phantom line of FIG. 10 and rack 14 is moved in the right-hand or left-hand direction in accordance with the rotary direction of motor 12. Three cam slots 14a, 14b and 14c are disposed in rack 14.

As shown in FIGS. 1 and 12, a pin 16a of a lever 16, pivotally supported by a shaft 15 of chassis 1, is inserted into first cam slot 14a. A slot 17a of a slide plate 17, sliding on chassis 1, has inserted therein a pin 16b of lever 16.

An elongated pin 17b (FIG. 5 and FIG. 12) at the other end of slide plate 17 is inserted into an elongated slot 11b of the rotary arm 11. When pin 16a is moved by cam slot 14a, lever 16 is rotated and pin 16b pushes slot 17a so that slide plate 17 is slid and rotary arm 11 is rotated by elongated pin 17b.

A pin 19a (FIG. 12) of a lever 19, pivotally supported by shaft 18 of chassis 1, is inserted into second cam slot 14b. One end of rotary arm 9 (FIG. 2) is fitted to the other of pins 19b of lever 19. When pin 19a is moved by cam slot 14b, lever 19 is rotated clockwise and rotary arm 9 is rotated so that holder 7 is moved along elongated slot 6a.

A pin 21a (FIG. 12) of a lever 21, pivotally supported by shaft 20 of chassis 1, is inserted into third cam slot 14c, and the other end of lever 21 is connected by pin 4a to support arm 4. Accordingly, when pin 21a is moved by cam slot 14c and lever 21 is rotated, support arm 4 is rotated and housing 6, supported by support arm 4 and support plate 5, is elevated and lowered.

As shown in FIG. 1, reference numeral 22 is a rotated head drum for mounting a magnetic head thereon and reference numeral 23 is a tape guide for pulling the tape out of the tape cassette and winding the tape around the head drum.

The operation of the cassette loading apparatus will now be described.

Figure 2:
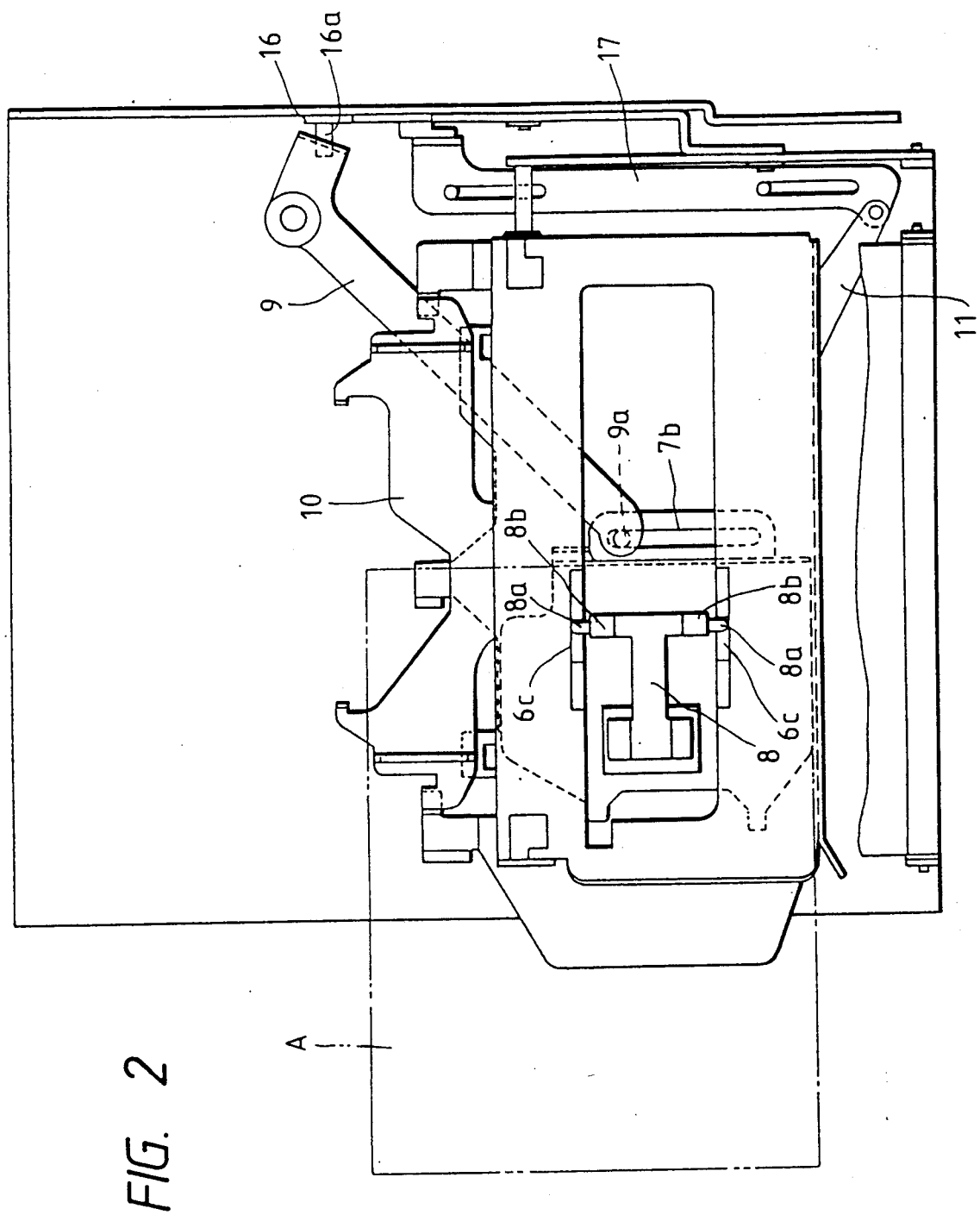
FIGS. 2 and 3 are plan views of a holder mechanism.

Before tape cassette A is inserted into the cassette loading apparatus, housing 6 is elevated as shown in FIG. 12, holder 7 is located near the cassette insertion port as shown in FIGS. 2 and 4, and slider opening-closing plate 10 is located upwards in FIG. 5, i.e., in a position away from slider $A_1$.

As shown in FIG. 4, tape cassette A is inserted into the insertion port of the cassette loading apparatus in a state in which the lid of tape cassette A is located on a side face of the cassette. At this time pin 8a is located on rising portion 6c so that rubber 8b is lifted upwards and does not press the upper face of the inserted tape cassette.

Figure 14:
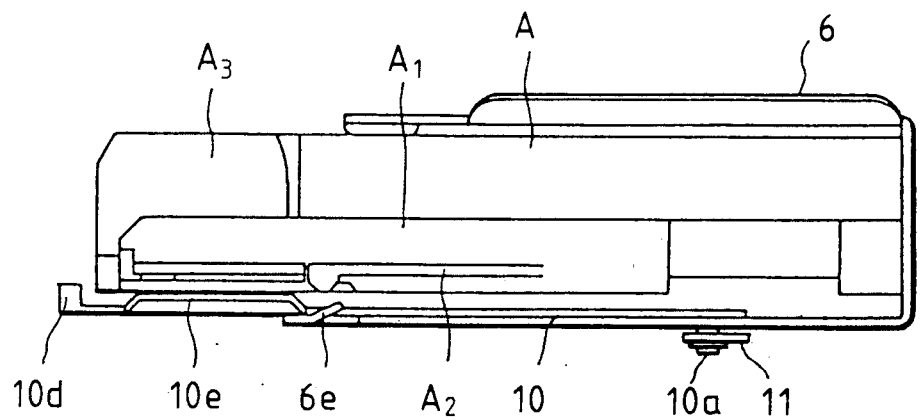
FIGS. 14 to 18 are front views showing the operations of the slider and a locking claw by the slider opening-closing plate.

Slanting face 10b of slider opening-closing plate 10 is located under support piece 6f and thereby slider opening-closing plate 10 is in the lowered state so that projecting portion 10e of slider opening-closing plate 10 is separated from locking claw $A_2$ as shown in FIG. 14.

However, when tape cassette A is inserted to a certain extent, the deep face of tape cassette A contacts deep vertical face 7c of holder 7 so that tape cassette A is deeply inserted in accordance with the insertion thereof.

Thus, pin 8a is moved and slides downwards from rising portion 6c so that rubber 8b presses the upper face of tape cassette A downwards as shown by the right-hand side in FIG. 4, thereby supporting tape cassette A between rubber 8b and bottom face 7d of holder 7.

Figure 11:
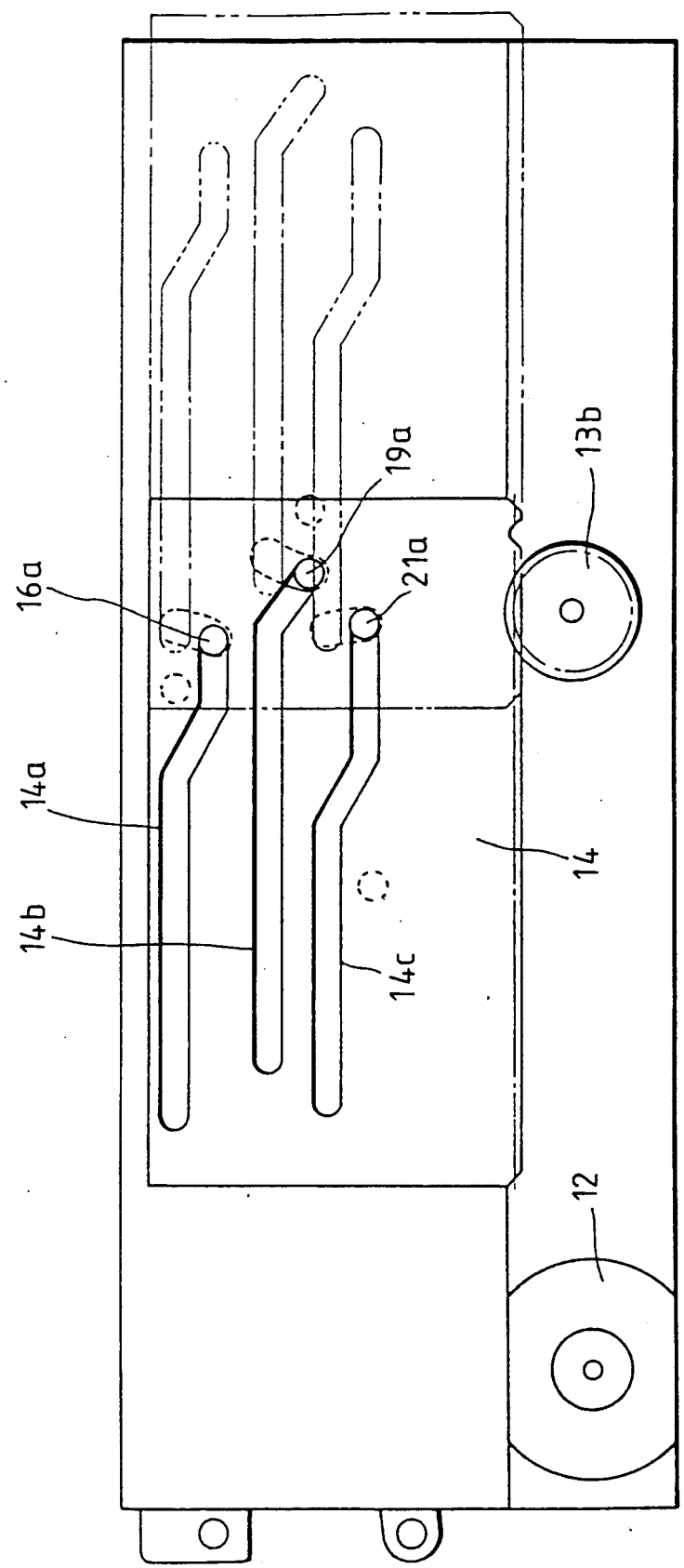
FIG. 11 is a rear view showing the operation of a rack.

When such a state occurs, an unillustrated switch is turned on by holder 7, and motor 12 begins to be rotated so that this rotation is transmitted to gear 13b, and rack 14 begins to move rightwards as shown by the phantom line of FIG. 11.

When rack 14 beings movement pin 19a inserted into second cam slot 14b is first moved by the slanting portion thereof and lever 19 is then rotated.

Figure 3:
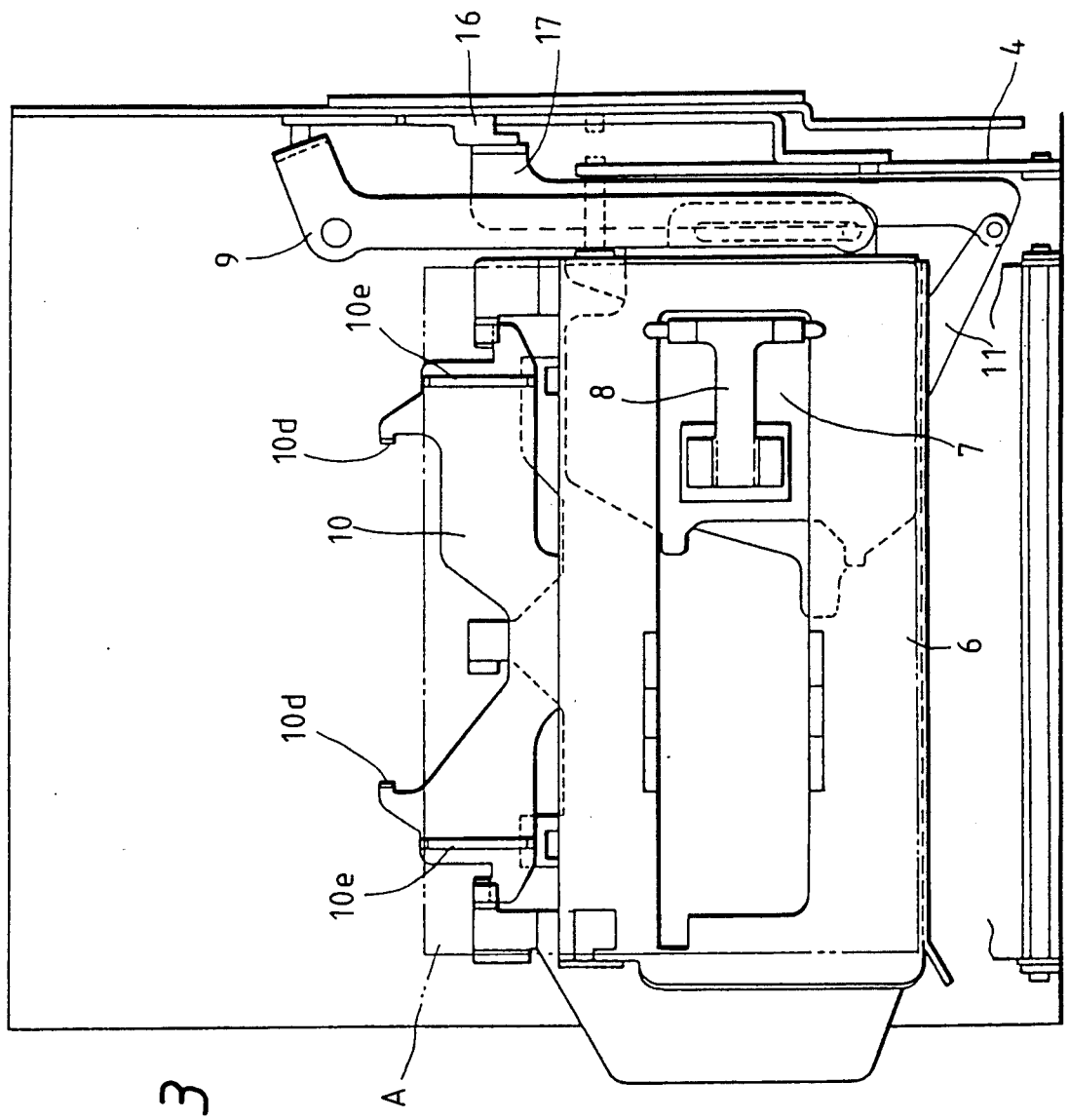

By the rotation of lever 19, pin 19b moves rotary arm 9, and holder 7 is moved to its position of FIG. 3 while pin 9b is slidably moved within guide slot 7b, thereby completely inserting tape cassette A into housing 6.

Figure 6:
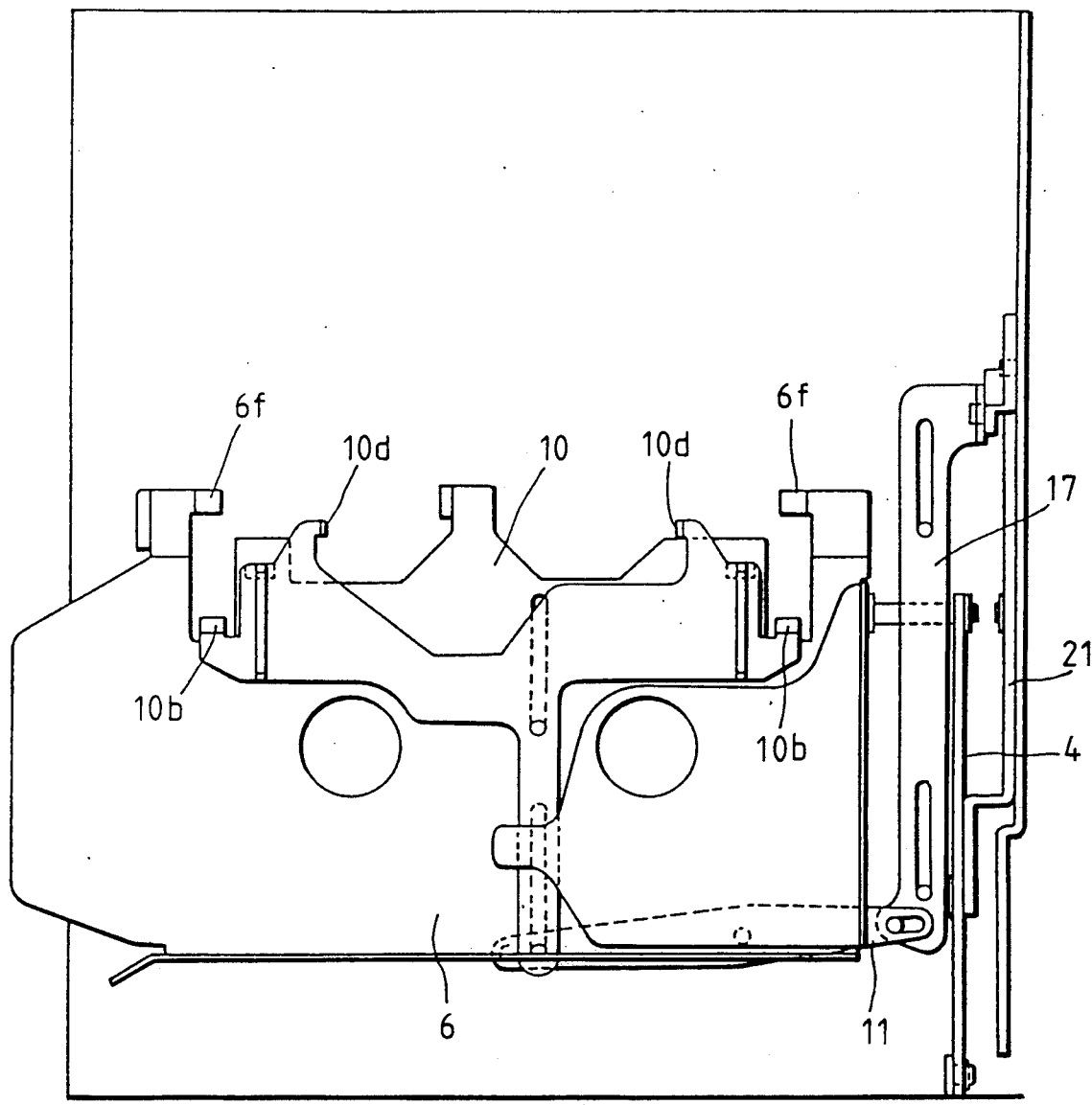

Next, when pin 16a, inserted into first cam slot 14a, is moved to the slanting portion thereof and begins to be moved thereby, lever 16 also beings to be rotated so that pin 16b moves slide plate 17 upwards as shown in FIG. 6.

Figure 15:
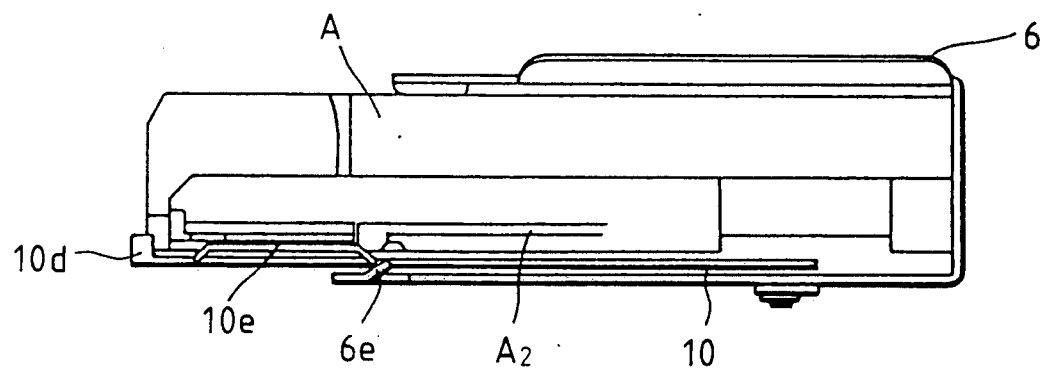

Accordingly, rotary arm 11 is rotated and thereby slider opening-closing plate 10 is moved downwards so that its slanting face 10b is disengaged from support piece 6f and support piece 10c contacts slanting face 6e. Thus, slider opening-closing plate 10 is elevated and its projecting portion 10e pushes locking claw $A_2$ of slider $A_1$ upwards as shown in FIG. 15.

Figure 16:
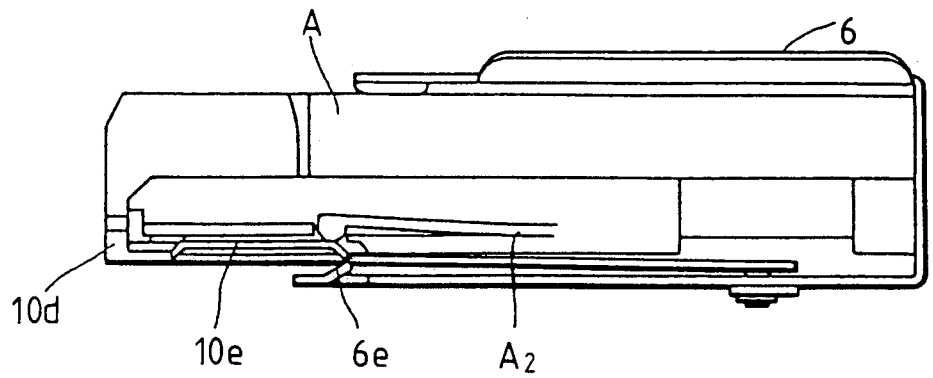

When slider opening-closing plate 10 is further moved, as shown in FIG. 16, projecting portion 10e completely pushes locking claw $A_2$ upwards so that the locking state of the locking claw is released and claw portion 10d contacts the front end of slider $A_1$.

Figure 17:
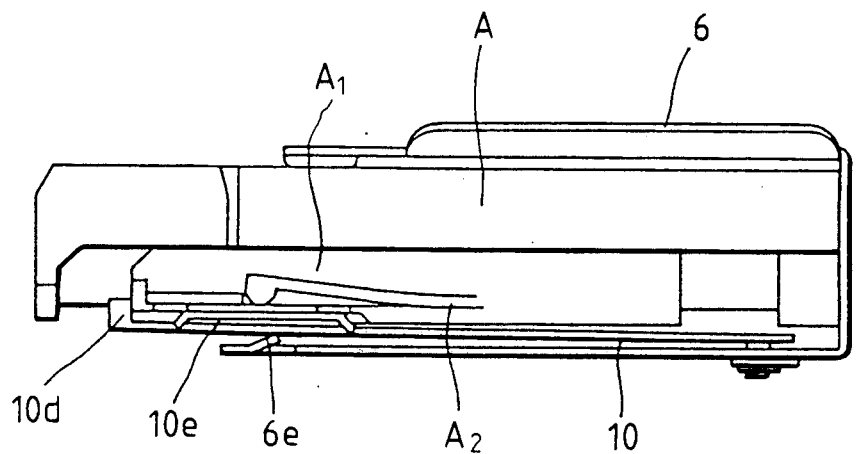
Figure 18:
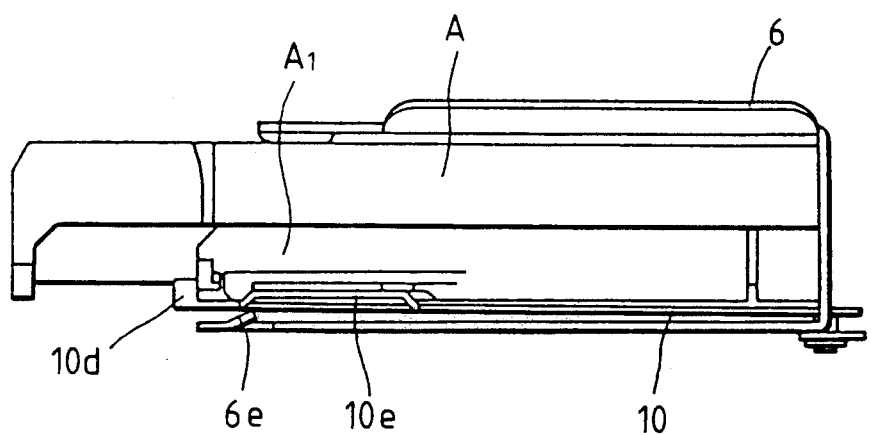

When slider opening-closing plate 10 is further moved, as shown in FIG. 17, slider $A_1$ is pressed and moved by claw portion 10d so that slider $A_1$ has been completely moved as shown in FIG. 18. When the locking state of lid $A_3$ is released, projecting portion 10e is moved to a position deeper than that of locking claw $A_2$ and locking claw $A_2$ is lowered to lock slider $A_1$.

Figure 13:
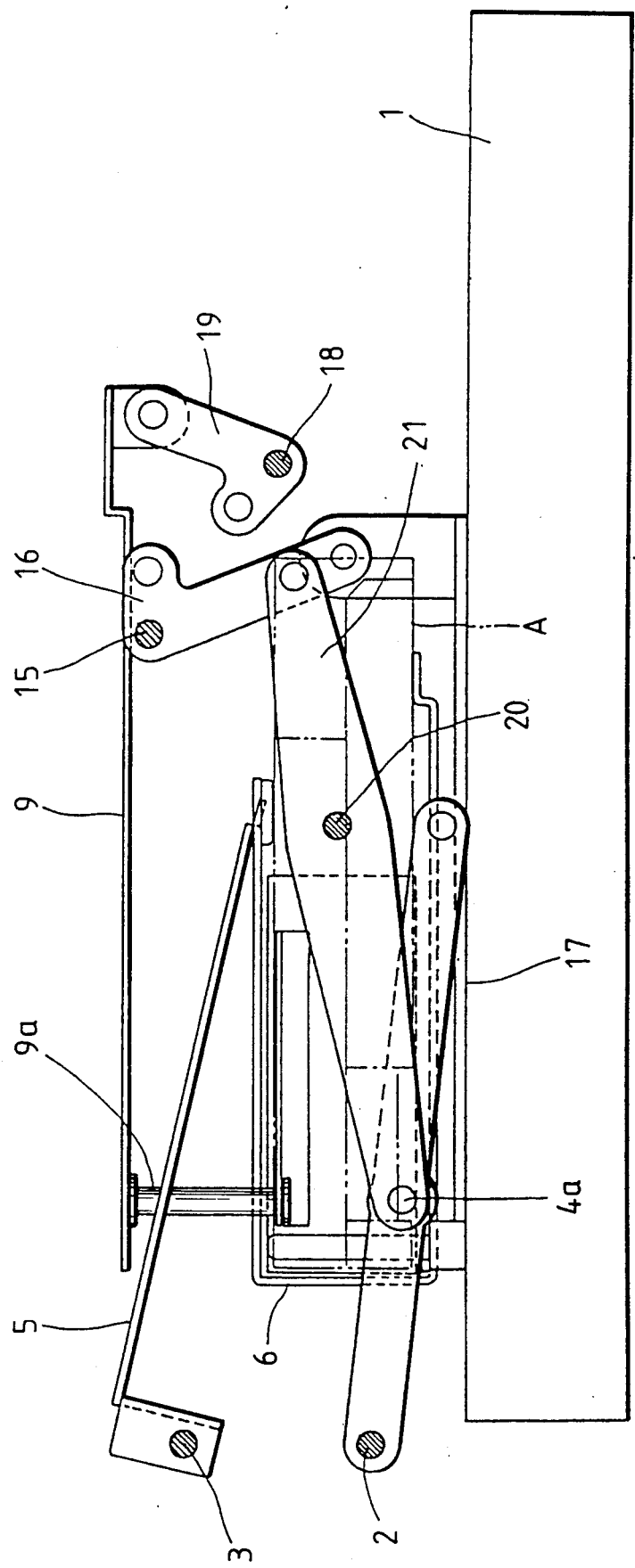

Next pin 21a inserted into third cam slot 14c reaches the slanting portion thereof and is moved so that lever 21 is rotated and pin 4a is pressed down, thereby rotating support arm 4 as shown in FIG. 13.

Therefore, housing 6 also rotates support plate 5 downwards as shown in FIG. 13. While support plate 5 is rotated downwards, lid A₃ is opened and tape cassette A is set to the tape drive mechanism.

Thus, the loading operation of tape cassette A has been completed. Subsequently, rack 14 continues to be moved and moves tape guide 23 by an unillustrated mechanism so that the tape is pulled out of the tape running face of tape cassette A and is wound around head drum 22.

When tape cassette A is in the loading state mentioned above and an ejecting command is provided, motor 12 is rotated in the reverse direction and thereby rack 14 is moved in the reverse direction so that housing 6, holder 7, and slider opening-closing plate 10 are operated in a way reverse to the above-mentioned way.

Therefore, the respective portions return to the inserted state of tape cassette A mentioned above and the ejecting operation is performed.

As mentioned above, in accordance with the present invention, the locking state of the lid is released by the sliding movement of the slider and the tape cassette for digital audio is set to the tape drive mechanism by insertion the tape cassette into the insertion port in a state in which the lid is located on a cassette side face.

Accordingly, the transversal width of the cassette insertion port of the tape deck can be set to a narrow width thereof when the lid is located on the cassette side face so that it is possible to reduce the width of the front face panel of the tape deck, which is suitable for a loading apparatus of a tape deck for a vehicle.

Further, since the transversal width of the insertion port can be reduced, it is possible to arrange a thumbscrew, a push button, and a display device disposed on the front face panel with a sufficient margin so that the operations thereof can be easily performed and the display can be easily seen.

The housing is elevated and lowered, and the holder is moved in the front and rear directions, and the slider opening-closing plate is moved in the right-hand and left-hand directions so that these members are moved in only three direction, X, Y and Z, thereby simplifying the operations and mechanism thereof.

Therefore, the cost of the apparatus can be reduced and the reliability thereof can be improved.

What is claimed is:

1. A cassette loading apparatus for a cassette tape of the type having a lid on an elongated side edge thereof, a slider movable between a locking and unlocking position for said lid, and a locking claw for locking said slider and lid in the locking position; said cassette having short sides transverse to said elongated side; said apparatus comprising:
   a housing having a cassette insertion opening sized to receive said cassette, short side first;
   a holder movably attached to said housing to receive said cassette upon insertion, said holder including means for press holding said cassette in place upon complete insertion of said cassette in said housing;
   a slider opening-closing plate having slider and locking claw engagement means for engaging said slider and locking claw of said cassette and moving them to an unlocked position; said slider opening-closing plate being movably positioned between a pre-insertion position whereby said engagement means are out of the way of said cassette insertion and a position of engagement with and movement of said slider and locking claw, and
   means for moving said holder, with cassette therein, to a fully inserted position in said housing, for moving said slider opening-closing plate from said first position to said second position to unlock said lid, and for moving said housing vertically between a tape loading position and a tape playing position.

2. A cassette loading apparatus as claimed in claim 1, wherein said means for press holding comprises a leaf spring having one end attached to said holder and an opposite free end comprising a rubberized pressing part and pins extending therefrom; said housing comprising a rising part positioned with respect to said pins on said leaf spring to cause said pins to ride up and down said rising part as said holder moves horizontally with respect to said housing thereby causing said free end of said leaf spring to press down on said cassette when said cassette is inserted and pushes said holder horizontally relative to said housing.

3. A cassette loading apparatus as claimed in claim 1, wherein said slider and locking claw engagement means comprises, respectively, a claw portion on the edge of said slider opening-closing plate positioned and adapted for engaging the ends of said slider and pulling said slider in a direction away from said lid, and a projection on said slider opening-closing plate positioned to engage and raise said locking claw of said cassette; said slider opening-closing plate being movably attached to said housing to move primarily horizontally and transversely with regard to said cassette insertion direction; said slider plate and said housing further comprising vertical rising means for causing slight vertical movement of said slider opening-closing plate as it moves horizontally.

4. A cassette loading apparatus as claimed in claim 1, wherein said moving means comprises:
   a cam plate having plural cam slots therein, plural lever arms having pins riding in said cam slots, and motor and gearing means to move said cam plate relative to said lever arm pins; said lever arms being interconnected to said housing, said holder, and said slider opening-closing plate, and said cam slots being arranged, to cause movement of said housing, said holder, and said slider opening-closing plate in the following order:
   (a) said holder moves horizontally in a direction the same as the insertion direction of said cassette to bring said cassette fully into said housing;
   (b) said slider opening-closing plate moves primarily horizontally and slightly vertically to unlock said cassette lid; and
   (c) said housing moves vertically to a tape playing position.

\* \* \* \* \*